| | | |
|---|---|---|
| (12) | United States Patent<br>Shiraki | (10) Patent No.: US 12,191,648 B2<br>(45) Date of Patent: Jan. 7, 2025 |

(54) ELECTRICAL CONNECTION BOX

(71) Applicant: SUMITOMO WIRING SYSTEMS, LTD., Mie (JP)

(72) Inventor: Takashi Shiraki, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 212 days.

(21) Appl. No.: 18/010,415

(22) PCT Filed: Jun. 9, 2021

(86) PCT No.: PCT/JP2021/021828
§ 371 (c)(1),
(2) Date: Dec. 14, 2022

(87) PCT Pub. No.: WO2021/261245
PCT Pub. Date: Dec. 30, 2021

(65) Prior Publication Data
US 2023/0253771 A1  Aug. 10, 2023

(30) Foreign Application Priority Data

Jun. 26, 2020 (JP) .................... 2020-110816

(51) Int. Cl.
*H02G 3/16* (2006.01)
*B60R 16/023* (2006.01)
(Continued)

(52) U.S. Cl.
CPC ........... *H02G 3/16* (2013.01); *B60R 16/0239* (2013.01); *H01R 9/18* (2013.01); *H01R 9/2458* (2013.01)

(58) Field of Classification Search
CPC . H02G 3/16; H02G 3/08; H02G 3/081; H01R 9/00; H01R 9/2458; H01R 9/18;
(Continued)

(56) References Cited

U.S. PATENT DOCUMENTS 7,799,991 B1 *  9/2010  Advey ............... H01R 13/5213
174/67
7,893,364 B2 *  2/2011  Oda ....................... H05K 7/026
439/949
(Continued)

FOREIGN PATENT DOCUMENTS

JP         2006-004733 A      1/2006
JP         2014-087221 A      5/2014

OTHER PUBLICATIONS

International Search Report issued on Sep. 7, 2021 for WO 2021/261245 A1 (4 pages).

*Primary Examiner* — Angel R Estrada
(74) *Attorney, Agent, or Firm* — Venjuris, P.C.

(57) ABSTRACT

A first electrical connection box includes a housing, a holder (40) that is provided inside the housing, and holds an electrical component (51) to which a first wire (21) is to be electrically connected; and a terminal block (60) attached to the holder (40). The terminal block (60) includes a terminal support base (61) attached to the holder (40), and a busbar (62) supported on the terminal support base (61). The busbar (62) includes a planar first connection surface (84), and a planar second connection surface (86) to which a second wire (22) is to be electrically connected. Also, the first electrical connection box further includes a relay busbar (90) that is provided inside the housing, and includes a third connection surface (97) that is electrically connected to the first connection surface (84), and a fourth connection surface (99) that is electrically connected to the electrical component (51).

5 Claims, 6 Drawing Sheets

(51) Int. Cl.
*H01R 9/18* (2006.01)
*H01R 9/24* (2006.01)

(58) Field of Classification Search
CPC ........ H01R 13/46; H05K 7/20; H05K 5/0052;
H05K 5/062; B60R 16/0238; B60R
16/00; B60R 16/02; B60R 16/0239
USPC .................. 174/50, 520, 59, 559, 560, 561;
439/76.1, 76.2, 949, 535, 536; 361/600,
361/601, 611, 641
See application file for complete search history.

(56) References Cited

U.S. PATENT DOCUMENTS

| | | | | |
|---|---|---|---|---|
| 8,395,061 | B2 * | 3/2013 | Asao | H02G 3/16 |
| | | | | 174/549 |
| 8,654,528 | B2 * | 2/2014 | Hashikura | H05K 7/026 |
| | | | | 361/728 |
| 8,969,723 | B2 * | 3/2015 | Hirasawa | H02G 3/088 |
| | | | | 439/76.1 |
| 9,685,715 | B2 * | 6/2017 | Yamauchi | H01M 8/04574 |
| 9,937,798 | B2 * | 4/2018 | Matsumura | H05K 7/026 |
| 10,971,853 | B2 * | 4/2021 | Ikeda | B60R 16/0207 |
| 11,139,646 | B2 * | 10/2021 | Koizumi | H01B 7/0018 |
| 2009/0253294 | A1 | 10/2009 | Akahori et al. | |
| 2016/0141772 | A1 | 5/2016 | Yamauchi et al. | |
| 2017/0072802 | A1 | 3/2017 | Matsumura | |
| 2021/0218163 | A1 | 7/2021 | Shimizu et al. | |

* cited by examiner

ELECTRICAL CONNECTION BOX

CROSS REFERENCE TO RELATED APPLICATIONS

This application is a national phase of PCT application No. PCT/JP2021/021828, filed on 9 Jun. 2021, which claims priority from Japanese patent application No. 2020-110816, filed on 26 Jun. 2020, all of which are incorporated herein by reference.

TECHNICAL FIELD

The present disclosure relates to an electrical connection box.

BACKGROUND

Conventionally, in vehicles such as automobiles, electrical apparatuses, electrical connection boxes, and the like that are disposed at positions apart from each other may be electrically connected to each other using electrical wires. In this case, if the electrical wires are long, there will be a risk that wiring of the electrical wires is difficult. Accordingly, in some cases, an electrical wire is divided into a plurality of wires in the longitudinal direction, and the divided wires are attached to a vehicle body. In this case, the divided wires are electrically connected to each other via a terminal block, which serves as a relay terminal for electrically connecting wires to each other.

As disclosed in Patent Document 1, the terminal block includes a conductive busbar, and an insulating resin component to which the busbar is assembled. By being electrically connected to the busbar of the terminal block assembled to the vehicle body, the wires for electrical connection are electrically connected to each other via the busbar.

PRIOR ART DOCUMENT

Patent Document

Patent Document 1: JP 2020-010514 A

SUMMARY OF THE INVENTION

Problems to be Solved

Meanwhile, in recent years, a large number of components are installed in a vehicle such as an automobile. Accordingly, in order to install a larger number of components in a vehicle, it is desirable to reduce a space for arranging electrical connection boxes and terminal blocks in the vehicle. That is to say, it is desirable to increase an arrangement space for components to be installed in the vehicle, other than electrical connection boxes and terminal blocks.

It is an object of the present disclosure to provide an electrical connection box that can have an increased arrangement space for other components.

Means to Solve the Problem

According to the present disclosure, an electrical connection box includes: a housing; a holder that is provided inside the housing, and holds an electrical component to which a first wire is to be electrically connected; and a terminal block attached to the holder, wherein the terminal block includes a terminal support base attached to the holder, and a busbar supported on the terminal support base, the busbar includes a planar first connection surface, and a planar second connection surface to which a second wire is to be electrically connected, the second wire being different from the first wire, and the electrical connection box further includes a relay busbar that is provided inside the housing, and includes a third connection surface that is electrically connected to the first connection surface, and a fourth connection surface that is electrically connected to the electrical component.

EFFECT OF THE INVENTION

The electrical connection box according to the present disclosure can have an increased arrangement space for other components.

DETAILED DESCRIPTION TO EXECUTE THE INVENTION

Description of Embodiments of Present Disclosure

Figure 1:
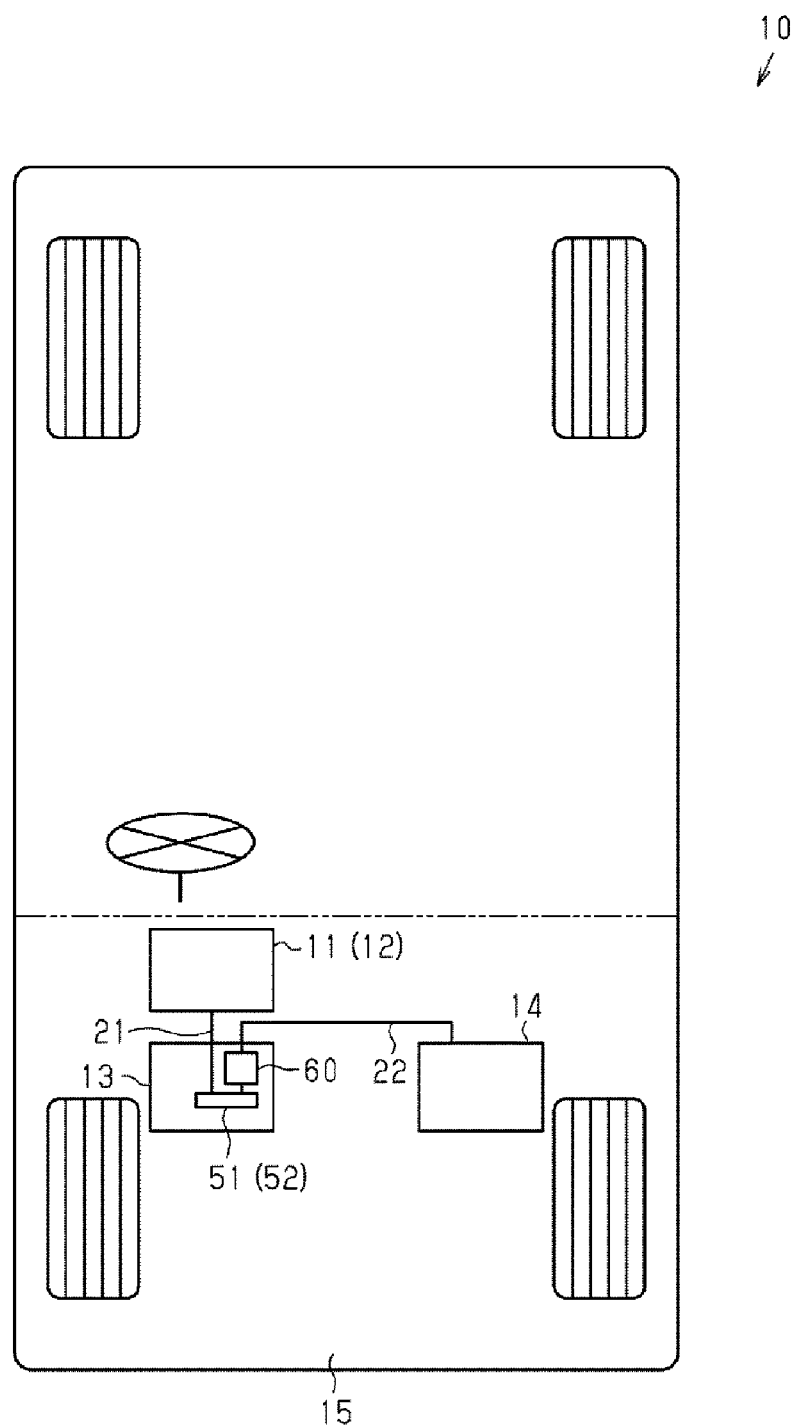
FIG. 1 is a schematic diagram illustrating a vehicle in which an electrical connection box according to an embodiment is installed.

First, embodiments of the present disclosure will be listed and described.

[1] An electrical connection box according to the present disclosure includes a housing; a holder that is provided inside the housing, and holds an electrical component to which a first wire is to be electrically connected; and a terminal block attached to the holder, wherein the terminal block includes a terminal support base attached to the holder, and a busbar supported on the terminal support base, the busbar includes a planar first connection surface, and a planar second connection surface to which a second wire is to be electrically connected, the second wire being different from the first wire, and the electrical connection box further includes a relay busbar that is provided inside the housing, and includes a third connection surface that is electrically connected to the first connection surface, and a fourth connection surface that is electrically connected to the electrical component.

According to this configuration, within the housing, the electrical component and the busbar of the terminal block can be electrically connected to each other via the relay busbar. By electrically connecting the second wire to the second connection surface, the electrical component can be electrically connected between the first wire and the second wire. Accordingly, it is no longer necessary to arrange an electrical connection box including the electrical component, and a terminal block, separately. Alternatively, it is no longer necessary to arrange an electrical connection box, and a terminal block including the electrical component, separately. Accordingly, an arrangement space for other components can be increased by the dimension obtained by the omission of a possible terminal block to be separately arranged.

[2] Preferably, when a direction perpendicular to the first connection surface is defined as a first direction, the second connection surface is perpendicular to a second direction that intersects with the first direction.

According to this configuration, the second connection surface is perpendicular to the second direction that intersects with the first direction perpendicular to the first connection surface. Accordingly, the busbar can be downsized in a direction parallel to the first connection surface, that is, a direction perpendicular to the first direction, compared to a case where the first connection surface and the second connection surface are coplanar. Also, the busbar can be downsized in a direction perpendicular to the first direction, compared to a case where the first connection surface and the second connection surface are parallel to each other and are lined up without overlapping each other when viewed in the first direction. Accordingly, it is possible to reduce the area of an installation space for the busbar when viewed in the first direction. As a result, the terminal block can be downsized in a direction perpendicular to the first direction, thus making it possible to suppress an increase in the size of the electrical connection box including the terminal block. Since an increase in the size of the electrical connection box due to the addition of the terminal block is suppressed in this way, even if the terminal block is formed as one piece with the electrical connection box, this can further contribute to increasing an arrangement space for other components.

[3] Preferably, when a direction perpendicular to the third connection surface is defined as a third direction, the fourth connection surface is perpendicular to a fourth direction that intersects with the third direction.

According to this configuration, the relay busbar can be downsized in a direction parallel to the third connection surface, that is, a direction perpendicular to the third direction, compared to a case where the third connection surface and the fourth connection surface are coplanar. Also, the relay busbar can be downsized in a direction perpendicular to the third direction, compared to a case where the third connection surface and the fourth connection surface parallel to each other and are lined up without overlapping each other when viewed in the third direction. Accordingly, it is possible to reduce the area of an installation space for the relay busbar when viewed in the third direction. As a result, it is possible to further suppress an increase in the size of the electrical connection box. Accordingly, this can further contribute to a space for arranging other components.

[4] Preferably, the terminal block includes a first bolt that penetrates the first connection surface and the third connection surface.

According to this configuration, by using a nut that is screwed to the first bolt, it is possible to easily electrically connect the first connection surface to the third connection surface.

[5] Preferably, the terminal block includes a second bolt that penetrates the second connection surface.

According to this configuration, by using a nut that is screwed to the second bolt, it is possible to easily electrically connect the second wire to the second connection surface.

DETAIL OF EMBODIMENTS OF PRESENT DISCLOSURE

The following will describe specific examples of the electrical connection box of the present disclosure with reference to the drawings. Note that the present invention is not limited to these examples but is defined by the claims, and all modifications within the meaning and scope equivalent to the claims are intended to be included.

The following will describe an embodiment of the electrical connection box.

FIG. 1 is a schematic diagram illustrating a vehicle 10 in which an electrical connection box 13 according to the present embodiment is installed, when viewed from above. A downward direction in FIG. 1 corresponds to the forward of the vehicle 10. A plurality of electrical apparatuses are installed in the vehicle 10. FIG. 1 shows only one electrical apparatus 11, among the plurality of electrical apparatuses installed in the vehicle 10. The electrical apparatus 11 is a battery 12 that can supply a voltage of, for example, more than a dozen of volts (e.g., 12 to 15 volts). The battery 12 is arranged in an engine room 15 provided in the front portion of the vehicle 10.

Also, a first electrical connection box 13 and a second electrical connection box 14 are installed in the vehicle 10. Note that electrical connection boxes may be referred to also as junction boxes, fuse boxes, relay boxes, and the like, but in the present specification, these are collectively referred to as electrical connection boxes. The electrical connection box 13 of the present embodiment is, for example, a relay box that includes a relay block having not-shown relay components.

The first electrical connection box 13 and the second electrical connection box 14 are arranged in the engine room 15 at positions away from the battery 12. Also, the first electrical connection box 13 and the second electrical connection box 14 are arranged in the engine room 15 at positions away from each other. In the present embodiment, the first electrical connection box 13 is arranged in a left-side portion of the engine room 15. The second electrical connection box 14 is arranged in a right-side portion of in the engine room 15.

The battery 12 is electrically connected to the second electrical connection box 14 via a first wire 21, the first electrical connection box 13, and a second wire 22.

First Electrical Connection Box 13

Figure 2:
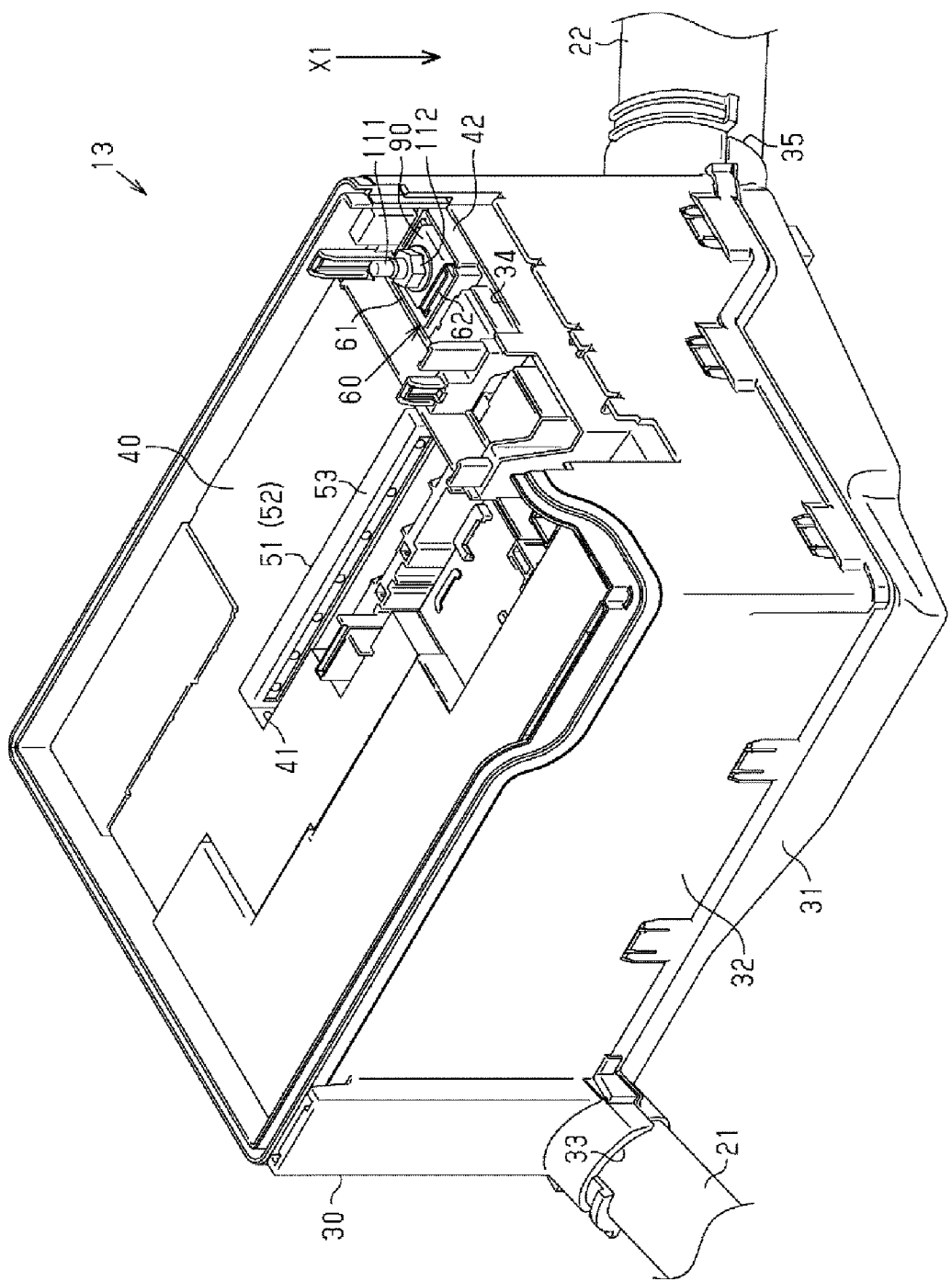
FIG. 2 is a perspective view illustrating the electrical connection box according to the embodiment.

As shown in FIG. 2, the first electrical connection box 13 includes a housing 30, a holder 40 provided inside the housing 30, and a terminal block 60 attached to the holder 40.

The housing 30 is cuboid. The housing 30 is made of an insulating synthetic resin material. The housing 30 includes a dish-shaped case 31, and a cover 32 that covers an opening of the case 31. The holder 40 is arranged in a housing space formed by the case 31 and the cover 32.

Holder 40 and Electrical Component 51

The holder 40 is made of an insulating synthetic resin material. The holder 40 holds at least one electrical component 51. Examples of the electrical component 51 include a fuse and a relay. In the present embodiment, the electrical component 51 includes a fusible link 52.

Figure 4:
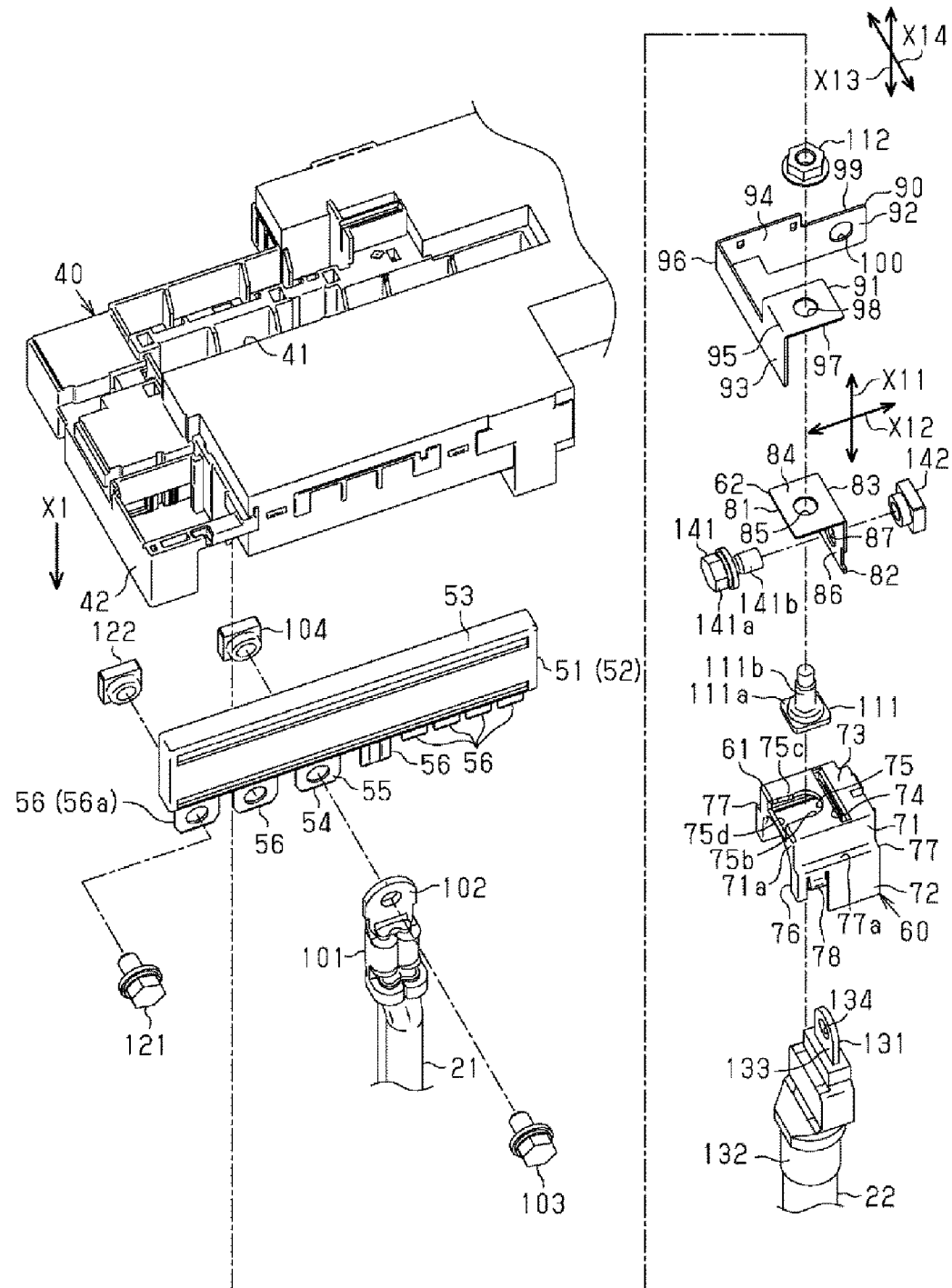
FIG. 4 is an exploded perspective view illustrating the holder, an electrical component, the terminal block, and a relay busbar that are included in the electrical connection box according to the embodiment.
Figure 5:
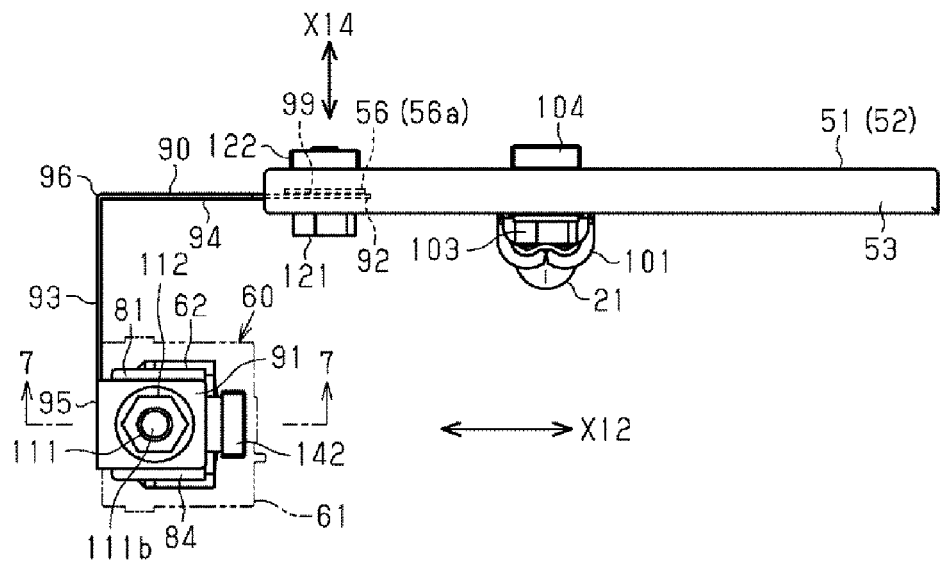
FIG. 5 is a plane view illustrating the electrical component, the terminal block, and the relay busbar that are included in the electrical connection box according to the embodiment.
Figure 6:
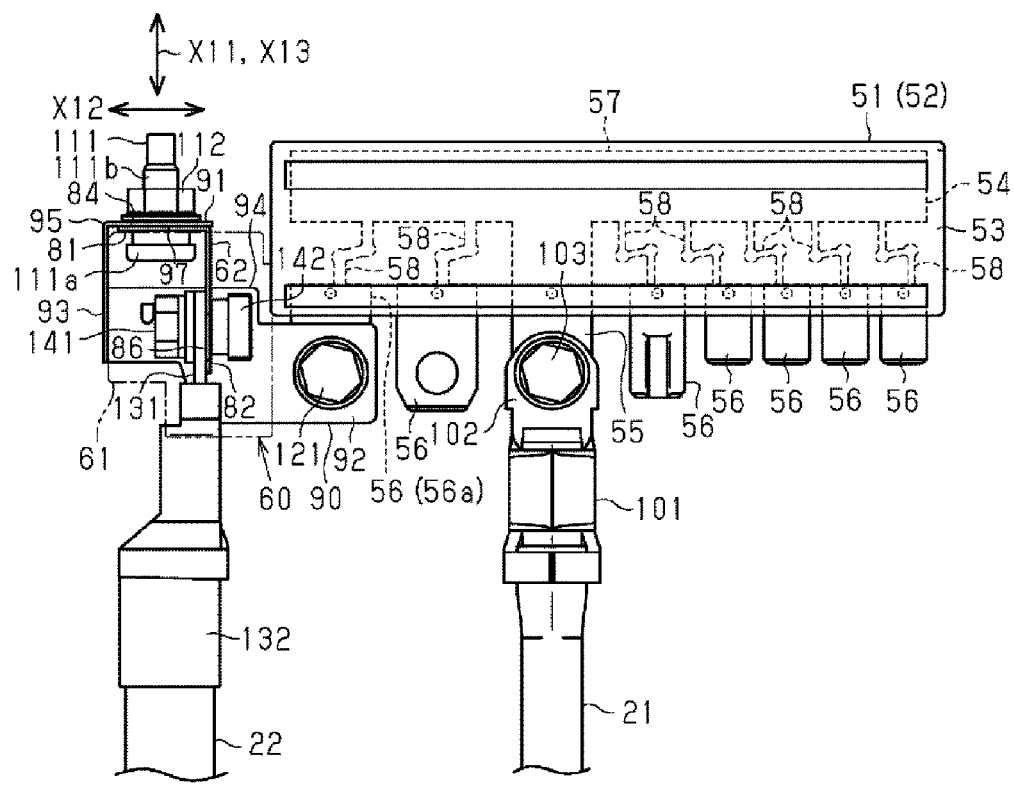
FIG. 6 is a side view illustrating the electrical component, the terminal block, and the relay busbar included in the electrical connection box according to the embodiment.

As shown in FIGS. 4 to 6, the fusible link 52 includes a case 53, and a power source distribution busbar 54 held by the case 53.

The case 53 is cuboid. In the present embodiment, the case 53 has the shape of a rectangular plate. The case 53 houses, inside the case 53, part of the power source distribution busbar 54.

The power source distribution busbar 54 is made of a metal material. The power source distribution busbar 54 is plate-shaped. The power source distribution busbar 54 includes a first terminal portion 55, a plurality of second terminal portions 56, a conductive portion 57, and a plurality of fusing portions 58. The first terminal portion 55, the second terminal portions 56, the conductive portion 57, and the fusing portions 58 are formed as one piece.

The first terminal portion 55 is exposed from the case 53 to the outside of the case 53. Also, the second terminal portions 56 protrude from the case 53 to the exposure of the case 53. In the present embodiment, when the fusible link 52 is viewed in the thickness direction of the case 53, the first terminal portion 55 and the plurality of second terminal portions 56 protrude from one end of the case 53 in a short-side direction to the outside of the case 53. Also, two second terminal portions 56, the first terminal portion 55, and five second terminal portions 56 are lined up in this order in the longitudinal direction of the case 53. Note that the second terminal portion 56 located at the leftmost position in FIG. 6 is defined as a second terminal portion 56a.

The conductive portion 57 has the shape of a rectangular plate. When the fusible link 52 is viewed in the thickness direction of the case 53, the conductive portion 57 extends in the longitudinal direction of the case 53. Inside the case 53, the first terminal portion 55 is directly coupled to the conductive portion 57.

The same number of fusing portions 58 are provided as the number of second terminal portions 56. The second terminal portions 56 are coupled to the conductive portion 57 via the fusing portions 58 extending from the respective second terminal portions 56. The fusing portions 58 have a cross-sectional area smaller than those of the second terminal portions 56 and the conductive portion 57. Therefore, if an overcurrent is supplied between any second terminal portion 56 and the conductive portion 57, the corresponding fusing portion 58 is mechanically blown out. That is to say, in the same case, the electrical connection between the second terminal portion 56 and the first terminal portion 55 is disabled.

Figure 3:
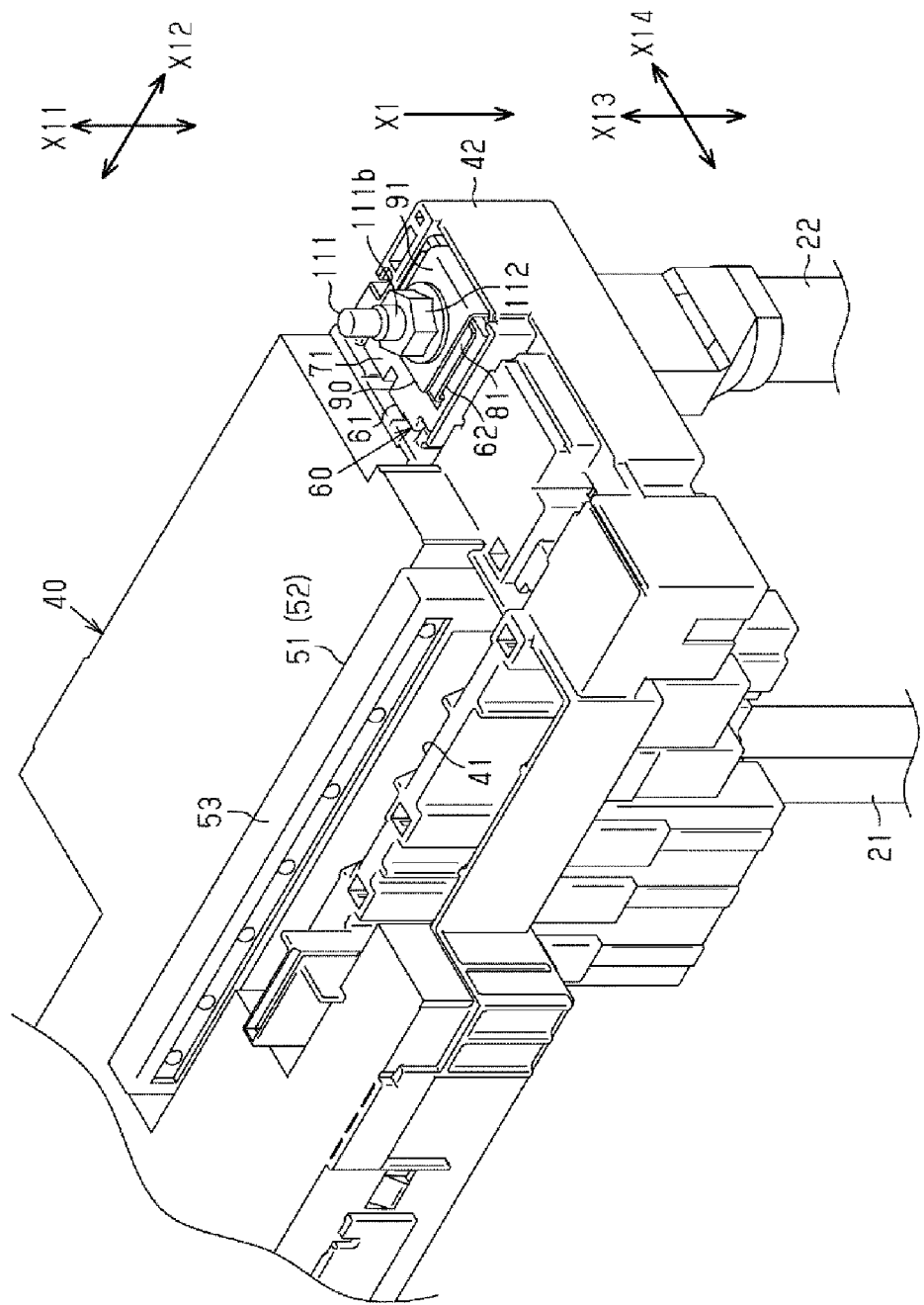
FIG. 3 is a perspective view illustrating a holder to which a terminal block according to the embodiment is attached.

As shown in FIGS. 3 and 4, the holder 40 includes a holding recess 41 that holds the fusible link 52. By being inserted into the holding recess 41, the fusible link 52 is held by the holder 40. The first terminal portion 55 and the second terminal portions 56 penetrate the bottom of the holding recess 41 and protrude to the outside of the holding recess 41.

The first wire 21 is electrically connected to the first terminal portion 55 protruding from the bottom of the holding recess 41 to the outside of the holding recess 41. The first wire 21 is, for example, a coated wire that includes a core wire made of an electrical conductor, and an insulating coating that coats the outer circumference of the core wire. One end portion of the first wire 21 is electrically connected to the battery 12 shown in FIG. 1. A first terminal 101 for electrically connecting the first wire 21 to the first terminal portion 55 is connected to the other end portion of the first wire 21. For example, when the not-shown core wire of the first wire 21 at the other end portion of the first wire 21 is electrically connected to one end portion of the first terminal 101 by welding, pressure bonding or the like, the first wire 21 and the first terminal 101 are electrically connected to each other. Also, the first terminal 101 includes, at an end portion of the first terminal 101 located opposite to its end to which the first wire 21 is connected, a first wire-side connection 102 in a flat-plate shape. In a state in which the first wire-side connection 102 is overlapped with the first terminal portion 55, a nut 104 is fastened to a bolt 103 passing through the first terminal portion 55 and the first wire-side connection 102. With this, the first wire 21 is electrically connected to the fusible link 52. As shown in FIG. 1, the first wire 21 is drawn from a first wire draw-out opening 33 formed in the housing 30 to the outside of the housing 30.

As shown in FIGS. 2 to 4, the holder 40 includes an attaching portion 42 to which the terminal block 60 is attached. The attaching portion 42 is formed as one piece with the portion of the holder 40 other than the attaching portion 42, that is, the portion including the holding recess 41. The attaching portion 42 is provided at a position of the holder 40 near the second terminal portion 56a. Here, a direction in which the cover 32 is fitted to the case 31 is defined as a fitting direction X1. The attaching portion 42 of the present embodiment is tubular extending in the fitting direction X1. The attaching portion 42 is square tubular such that the shape of the attaching portion 42 when viewed in the fitting direction X1 is square.

As shown in FIG. 2, the cover 32 has an exposure opening 34 that exposes the attaching portion 42 to the outside of the housing 30. The exposure opening 34 is provided in a portion of the cover 32 that is overlapped with the attaching portion 42 in the fitting direction X1. Also, the housing 30 has a second wire draw-out opening 35 near the exposure opening 34. The second wire draw-out opening 35 is in communication with the inside and outside of the housing 30.

Terminal Block 60

As shown in FIGS. 3 and 4, the terminal block 60 includes a terminal support base 61 attached to the holder 40, and a busbar 62 supported on the terminal support base 61.

Terminal support base 61

The terminal support base 61 is made of an insulating synthetic resin material. The terminal support base 61 includes a plate-shaped support portion 71, and a fitting portion 72 extending from the outer peripheral edge of the support portion 71. The support portion 71 and the fitting portion 72 are formed as one piece. The terminal support base 61 has the shape of a closed tube whose bottom is configured by the support portion 71.

Figure 7:
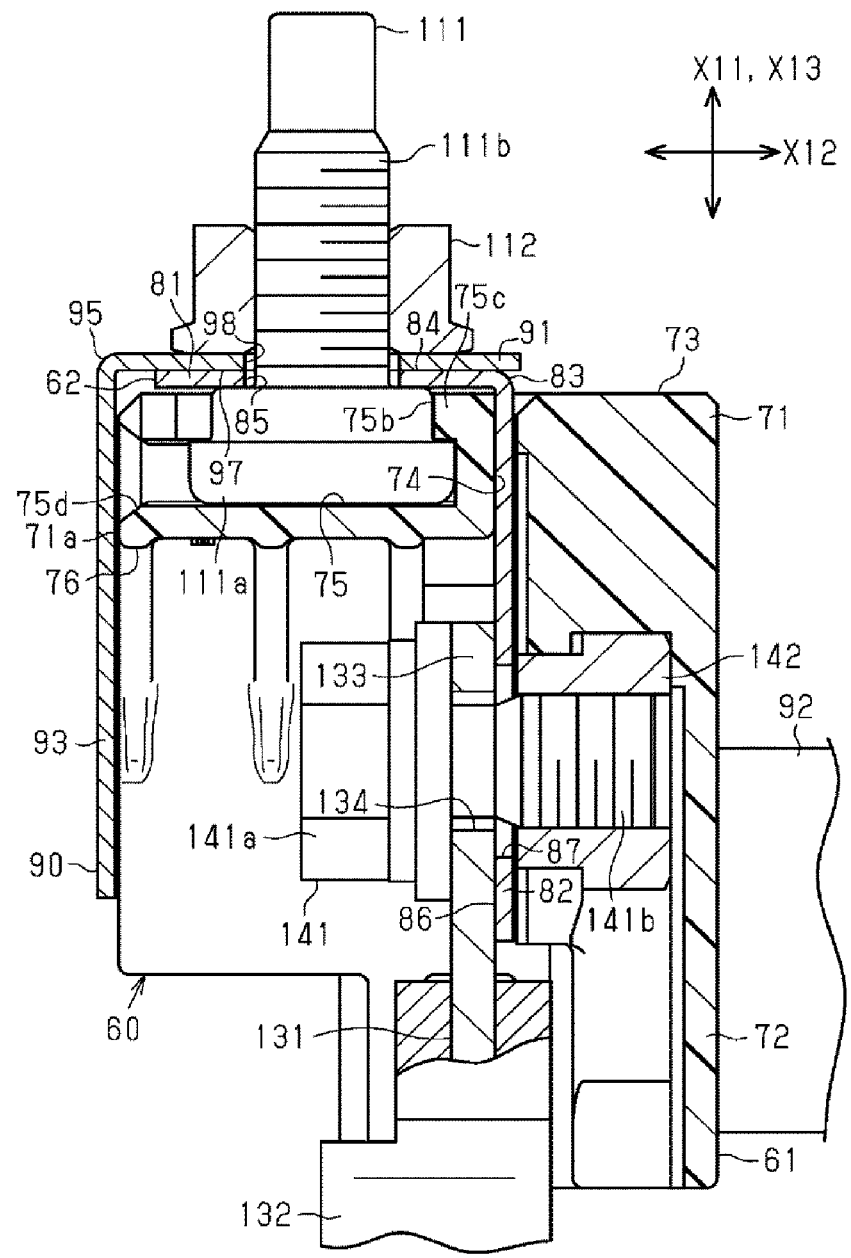
FIG. 7 is a cross-sectional view illustrating the terminal block and the relay busbar that are included in the electrical connection box according to the embodiment.

As shown in FIGS. 4 and 7, the support portion 71 has a square shape corresponding to the inner peripheral surface of the attaching portion 42, when viewed in the thickness direction of the support portion 71. Note that FIG. 7 is a cross-sectional view taken along a line 7-7 in FIG. 5. The support portion 71 has, on a surface of the support portion 71, a planar support surface 73. In the present embodiment, the support surface 73 is a side surface of the support portion 71 on one side in the thickness direction of this support portion 71, and constitutes a part of the outer surface of the terminal support base 61.

The support portion 71 has an insertion hole 74. The insertion hole 74 penetrates the support portion 71 in the thickness direction of this support portion 71. The insertion hole 74 is slit-shaped extending linearly when viewed in a direction perpendicular to the support surface 73. In the present embodiment, the insertion hole 74 extends parallel to one side surface 71a, among four side surfaces constituting the outer peripheral surface of the support portion 71, when viewed in the direction perpendicular to the support surface 73.

Also, the support portion 71 includes an insertion recess 75. In the support portion 71, the insertion recess 75 is formed between the insertion hole 74 and the side surface 71a. The insertion recess 75 is recessed from the support surface 73 in the thickness direction of the support portion 71. The bottom of the insertion recess 75 is parallel to the support surface 73. In an opening 75b of the insertion recess 75 that is formed in the support surface 73, a retaining portion 75c is provided that extends, like eaves, in directions parallel to the support surface 73 so as to reduce the dimension of the opening 75b. Also, the support portion 71 includes, in addition to the opening 75b of the insertion recess 75, an insertion opening 75d that is in communication with the inside of the insertion recess 75 and the outside of the terminal support base 61. The insertion opening 75d is formed in the side surface 71a. Also, the insertion opening 75d is continuous with the opening 75b. The insertion opening 75d is open in a direction perpendicular to the direction in which the insertion hole 74 extends, when viewed in the direction perpendicular to the support surface 73.

The fitting portion 72 is square tubular. The fitting portion 72 includes a cutout 76 that is in communication with the inside and outside of the fitting portion 72. The cutout 76 is provided at a position of the fitting portion 72 that is lined up with the insertion opening 75d in the direction perpendicular to the support surface 73. Also, when viewed in the direction perpendicular to the support surface 73, the insertion hole 74 and the cutout 76 are lined up in the direction perpendicular to the direction in which the insertion hole 74 extends. The cutout 76 penetrates the fitting portion 72 in the direction perpendicular to the direction in which the insertion hole 74 extends, when viewed in the direction perpendicular to the support surface 73, and is open to the side opposite to the support portion 71.

The fitting portion 72 includes first locked portions 77 and second locked portions 78 that are used to fix the terminal support base 61 to the attaching portion 42. The first locked portions 77 are provided at both end portions of the fitting portion 72 in the direction in which the insertion hole 74 extends, when viewed in the direction perpendicular to the support surface 73. The first locked portions 77 are step-shaped while protruding to outer peripheral sides of the fitting portion 72. The first locked portions 77 each have a first locked surface 77a that is directed to the same direction as the support surface 73, and is parallel to the support surface 73.

The second locked portions 78 are provided at both end portions of the fitting portion 72 in the direction in which the insertion hole 74 extends, when viewed in the direction perpendicular to the support surface 73. At both end portions of the fitting portion 72 in the direction in which the insertion hole 74 extends, the second locked portions 78 are respectively provided at positions further away from the support surface 73 in the direction perpendicular to the support surface 73 than the first locked surfaces 77a. The second locked portions 78 each have a not-shown second locked surface that faces away from the support surface 73.

As shown in FIGS. 2 to 4, the terminal support base 61 is attached to the attaching portion 42 by being inserted into this attaching portion 42. The terminal support base 61 is inserted into the attaching portion 42 so that the support portion 71 is located on the cover 32 side, and the fitting portion 72 is located on the case 31 side. Note that the attaching portion 42 includes not-shown first locking portions to which the first locked portions 77 are locked in the insertion direction of the fitting portion 72 into the attaching portion 42. The attaching portion 42 further includes not-shown second locking portions to which the second locked portions 78 are locked in the opposite direction to the insertion direction of the fitting portion 72 into the attaching portion 42. As a result of the first locked surfaces 77a of the first locked portions 77 abutting against the first locking portions, the terminal support base 61 is prevented from being removed from the attaching portion 42 in the insertion direction of the terminal support base 61 into the attaching portion 42. Also, as a result of the second locked surfaces of the second locked portions 78 abutting against the second locking portions, the terminal support base 61 is prevented from being removed from the attaching portion 42 in the opposite direction to the insertion direction of the terminal support base 61 into the attaching portion 42.

Busbar 62

As shown in FIGS. 4 to 7, the busbar 62 includes a first connection 81 and a second connection 82. The busbar 62 is made of a metal material. Examples of the material of the busbar 62 include a metal material having excellent conductive properties, such as copper, a copper alloy, aluminum, and an aluminum alloy, but the present invention is not limited to this and any material may be used as long as it is a metal material.

The busbar 62 of the present embodiment is band-shaped. The first connection 81 is provided at one end portion of the busbar 62 in the longitudinal direction, and the second connection 82 is provided at the other end portion of the busbar 62 in the longitudinal direction. The busbar 62 has a bent portion 83 between the first connection 81 and the second connection 82. The bent portion 83 is a portion of the busbar 62 that is formed by bending a metal plate material making up the busbar 62. Of the busbar 62 of the present embodiment, a portion from the bent portion 83 to one end of the busbar 62 in the longitudinal direction serves as the first connection 81, and a portion from the bent portion 83 to the other end of the busbar 62 in the longitudinal direction serves as the second connection 82. Accordingly, the busbar 62 of the present embodiment is L-shaped when viewed in a direction parallel to the first connection 81 and in a direction parallel to the second connection 82.

The first connection 81 has the shape of a square flat plate. A side surface of the first connection 81 on one side in the thickness direction is a flat first connection surface 84. In FIGS. 4 and 7, of two side surfaces of the first connection 81 in the thickness direction, the upper side surface corresponds to the first connection surface 84. Here, the direction perpendicular to the first connection surface 84 is defined as a first direction X11.

The first connection 81 has a first through hole 85 that penetrates the first connection 81 in the thickness direction thereof. The first through hole 85 penetrates the first connection 81 in the first direction X11. An opening of the first through hole 85 at an end in the penetrating direction is formed in the first connection surface 84.

The second connection 82 has the shape of a square flat plate. A side surface of the second connection 82 on one side in the thickness direction is a second connection surface 86 to which the second wire 22, which is different from the first wire 21, is to be electrically connected. In FIGS. 4 and 7, of two side surface of the second connection 82 in the thickness direction, a side surface directed to the left corresponds to the second connection surface 86. The second connection surface 86 has the shape of a flat plate perpendicular to a second direction X12, which intersects with the first direction X11. In the present embodiment, the second direction X12 is a direction that intersects perpendicularly with the first direction X11. Accordingly, the second connection surface 86 is provided so as to be perpendicular to the first connection surface 84.

The second connection 82 has a second through hole 87 that penetrates the second connection 82 in the thickness direction thereof. The second through hole 87 penetrates the second connection 82 in the second direction X12. An opening of the second through hole 87 at an end in the penetrating direction is formed in the second connection surface 86.

The busbar 62 is supported on the terminal support base 61 with the second connection 82 inserted into the insertion hole 74 from the support surface 73 side. In the state in which the busbar 62 is supported on the terminal support base 61, the second connection 82 protrudes to the inside of the fitting portion 72 from the insertion hole 74, and the second through hole 87 is located on the inner side of the fitting portion 72. Furthermore, the second through hole 87 is overlapped with the cutout 76 in the second direction X12. Also, in the same state, the first connection 81 is arranged on the support surface 73 with the first connection surface 84 facing away from the support surface 73. Also, the first connection surface 84 is parallel to the support surface 73. That is to say, the first direction X11 is perpendicular to the support surface 73. Also, the first through hole 85 is overlapped with the opening 75b of the insertion recess 75 in the first direction X11.

The terminal block 60 includes a first bolt 111. The first bolt 111 includes a head 111a and a shaft 111b that protrudes from the head 111a. A spiral thread groove is formed in the outer circumferential surface of the shaft 111b. The first bolt 111 is assembled to the terminal support base 61 before the busbar 62 is assembled to the terminal support base 61. Specifically, by inserting the head 111a of the first bolt 111 into the insertion recess 75 from the insertion opening 75d with the leading end of the shaft 111b facing away from the fitting portion 72, the first bolt 111 is assembled to the support portion 71. The shaft 111b protrudes from the opening 75b of the insertion recess 75 to the outside of the terminal support base 61. Note that the head 111a is prevented from being removed from the opening 75b to the outside of the insertion recess 75 by the retaining portion 75c. In a state in which the first bolt 111 is assembled to the terminal support base 61, the central axis of the shaft 111b is perpendicular to the support surface 73.

The first connection 81 is disposed on the support surface 73 with the shaft 111b of the first bolt 111 inserted into the first through hole 85. Accordingly, the shaft 111b is in a state of penetrating the first connection surface 84. The central axis line of the shaft 111b is perpendicular to the first connection surface 84, that is, parallel to the first direction X11.

Relay Busbar 90

As shown in FIG. 2, the first electrical connection box 13 includes a relay busbar 90 provided inside the housing 30. The relay busbar 90 is used to electrically connect the fusible link 52 and the busbar 62 in the housing 30.

As shown in FIGS. 4 to 7, the relay busbar 90 is plate-shaped. Note that FIGS. 5 and 6 only show the outer shape of the terminal support base 61 with a dashed-two dotted line. The relay busbar 90 is made of a metal material. Examples of the material of the relay busbar 90 include a metal material having excellent conductive properties, such as copper, a copper alloy, aluminum, and an aluminum alloy, but the present invention is not limited to this and any material may be used as long as it is a metal material.

The relay busbar 90 of the present embodiment is band-shaped. The relay busbar 90 includes a third connection 91 and a fourth connection 92. The third connection 91 is provided at one end portion of the relay busbar 90 in the longitudinal direction. The fourth connection 92 is provided at the other end portion of the relay busbar 90 in the longitudinal direction. Also, the relay busbar 90 includes a first coupling portion 93 and a second coupling portion 94 that couple the third connection 91 and the fourth connection 92 to each other. The third connection 91, the fourth connection 92, the first coupling portion 93, and the second coupling portion 94 are each plate-shaped. The first coupling portion 93 extends from the third connection 91. The second coupling portion 94 extends from the first coupling portion 93 to the fourth connection 92.

Also, the relay busbar 90 includes a first bent portion 95 between the third connection 91 and the first coupling portion 93. Furthermore, the relay busbar 90 includes a second bent portion 96 between the first coupling portion 93 and the second coupling portion 94. The first bent portion 95 and the second bent portion 96 are portions of the relay busbar 90 formed by bending a metal plate material making up the relay busbar 90. In the relay busbar 90 of the present embodiment, the portion from one end of the relay busbar 90 in the longitudinal direction to the first bent portion 95 serves as the third connection 91, and the portion from the first bent portion 95 to the second bent portion 96 serves as the first coupling portion 93. Note that the second coupling portion 94 and the fourth connection 92 has the shape of a continuous flat plate. Also, in the present embodiment, the first bent portion 95 is bent so that the first coupling portion 93 is perpendicular to the third connection 91. Also, the second bent portion 96 is bent so that the second coupling portion 94 is perpendicular to the first coupling portion 93.

The third connection 91 has the shape of a square flat plate. A side surface of the third connection 91 on one side in the thickness direction is a third connection surface 97 that is electrically connected to the first connection surface 84. In FIGS. 6 and 7, of two side surface of the third connection 91 in the thickness direction, the lower side surface corresponds to the third connection surface 97. The third connection surface 97 is planar. Here, the direction perpendicular to the third connection surface 97 is defined as a third direction X13.

The third connection 91 includes a third through hole 98 that penetrates the third connection 91 in the thickness direction. The third through hole 98 penetrates the third connection 91 in the third direction X13. An opening of the third through hole 98 at one end in the penetrating direction is formed in the third connection surface 97.

The fourth connection 92 has the shape of a square flat plate. A side surface of the fourth connection 92 on one side in the thickness direction is a fourth connection surface 99 that is electrically connected to the second terminal portion 56a of the fusible link 52. In FIGS. 4 and 6, of two side surfaces of the fourth connection 92 in the thickness direction, the side surface directed rearward in paper plane corresponds to the fourth connection surface 99. The fourth connection surface 99 has the shape of a flat plate perpendicular to a fourth direction X14, which intersects with the third direction X13. In the present embodiment, the fourth direction X14 is a direction that intersects perpendicularly with the third direction X13. Accordingly, the fourth connection surface 99 is provided so as to be perpendicular to the third connection surface 97.

The fourth connection 92 has a fourth through hole 100 that penetrates the fourth connection 92 in the thickness direction. The fourth through hole 100 penetrates the fourth connection 92 in the fourth direction X14. An opening of the fourth through hole 100 at an end in the penetrating direction is formed in the fourth connection surface 99.

The relay busbar 90 is arranged inside the housing 30 in a state in which the third connection surface 97 is overlapped with the first connection surface 84, and the fourth connection surface 99 is overlapped with the second terminal portion 56a. Specifically, the third connection 91 of the relay busbar 90 is overlapped with the first connection 81 with a shaft 111b inserted into the third through hole 98. Also, the third connection surface 97 abuts against the first connection surface 84. In this state, the third direction X13 is parallel to the first direction X11. Also, as a result of a first nut 112 being fastened to the shaft 111b from the leading end side of the shaft 111b, the first connection 81 and the third connection 91 are interposed between the first nut 112 and the head 111a. With this, the fourth connection surface 99 is electrically connected to the third connection surface 97. That is to say, the busbar 62 and the relay busbar 90 are electrically connected to each other.

Also, the fourth connection 92 of the relay busbar 90 is overlapped with the second terminal portion 56a so that the fourth connection surface 99 abuts against the second terminal portion 56a. Also, a nut 122 is fastened to a bolt 121 passing through the fourth through hole 100 and the second terminal portion 56a. With this, the fourth connection surface 99 is electrically connected to the fusible link 52. Also, the fusible link 52 and the busbar 62 are electrically connected to each other via the relay busbar 90.

Note that as shown in FIGS. 3 and 7, the first coupling portion 93 is arranged in parallel to the side surface 71a so as to cover the insertion opening 75d. Also, the first coupling portion 93 is arranged between the side surface 71a and the inner peripheral surface of the attaching portion 42.

As shown in FIGS. 4 and 7, the second wire 22 is electrically connected to the second connection 82 that protrudes to the inner side of the fitting portion 72. The second wire 22 is, for example, a coated wire that includes a core wire made of an electrical conductor, and an insulating coating that coats the outer circumference of the core wire. One end portion of the second wire 22 is electrically connected to the second electrical connection box 14 shown in FIG. 1. A second terminal 131 for electrically connecting the second wire 22 to the busbar 62 is connected to the other end portion of the second wire 22. For example, when the not-shown core wire of the second wire 22 at the other end portion of the second wire 22 is electrically connected to one end portion of the second terminal 131 by welding, pressure bonding or the like, the second wire 22 and the second terminal 131 are electrically connected to each other. The electrical connection portion between the core wire of the second wire 22 and the second terminal 131 is coated by an insulating member 132 that has insulating properties. For example, a heat shrinkable tube can be used as the insulating member 132.

The second terminal 131 includes, at an end portion of the second terminal 131 located opposite to its end to which the second wire 22 is connected, a second wire-side connection 133 in a flat-plate shape. The second wire-side connection 133 has a second connection hole 134 that penetrates the second wire-side connection 133 in the thickness direction.

The terminal block 60 includes a second bolt 141 for electrically connecting the second wire 22 to the busbar 62. The second bolt 141 includes a head 141a and a shaft 141b that protrudes from the head 141a. A spiral thread groove is formed in the outer circumferential surface of the shaft 141b. Also, the terminal block 60 includes a second nut 142 for electrically connecting the second wire 22 to the busbar 62. The second nut 142 is arranged between the second connection 82 and the fitting portion 72 that are lined up in the second direction X12.

The second wire-side connection 133 is overlapped with the second connection surface 86 so that the second connection hole 134 overlaps with the second through hole 87. Also, the second wire-side connection 133 abuts against the second connection surface 86. The second bolt 141 is screwed to the second nut 142 in such a manner that the shaft 141b thereof passes through the second connection hole 134 and the second through hole 87. Note that the second bolt 141 can easily be screwed to the second nut 142 because a not-shown tool for screwing the second bolt 141 to the second nut 142 can be inserted into the fitting portion 72 from the cutout 76. As a result of the shaft 141b passing through the second through hole 87, the second bolt 141 penetrates the second connection surface 86.

In a state in which the second nut 142 is fastened to the second bolt 141, the central axis line of the shaft 141b is perpendicular to the second connection surface 86, that is, parallel to the second direction X12. Also, in the same state, the second connection 82 and the second wire-side connection 133 are interposed and held between the head 141a of the second bolt 141 and the second nut 142, while abutting against each other. That is to say, the second wire-side connection 133 is electrically connected to the second connection 82. In this way, the second wire 22 is electrically connected to the busbar 62 via the second terminal 131. Also, the second wire 22 is drawn to the outside of the terminal support base 61 from the end portion of the fitting portion 72 that is opposite to the support portion 71.

Note that as shown in FIGS. 2 and 7, the second wire 22 is electrically connected to the second connection surface 86 before the holder 40 is housed in the housing 30. Also, the second wire 22 electrically connected to the second connection surface 86 is drawn to the outside of the housing 30 from the second wire draw-out opening 35.

The following will describe functions of the present embodiment.

As a result of the terminal support base 61 included in the terminal block 60 being attached to the attaching portion 42, the terminal block 60 is attached to the holder 40. The first wire 21 is electrically connected to the fusible link 52 held by the holder 40. Also, the relay busbar 90 provided inside the housing 30 is electrically connected to the fusible link 52. The first wire 21 and the relay busbar 90 are electrically connected to each other via the fusible link 52. Furthermore, the relay busbar 90, and the second terminal 131 connected to an end portion of the second wire 22 on one side are electrically connected to the busbar 62 supported on the terminal support base 61. Accordingly, the first wire 21 and the second wire 22 can be electrically connected to each other via the fusible link 52. Therefore, electric power of the battery 12 can be supplied to the second electrical connection box 14 via the fusible link 52.

The following will describe effects of the present embodiment.

(1) The first electrical connection box 13 includes the housing 30, the holder 40 that holds the electrical component 51 to which the first wire 21 is to be electrically connected, and that is provided inside the housing 30, and the terminal block 60 attached to the holder 40. The terminal block 60 includes the terminal support base 61 attached to the holder 40, and the busbar 62 supported on the terminal support base 61. The busbar 62 includes the planar first connection surface 84, and the planar second connection surface 86 to which the second wire 22, which is different from the first wire 21, is electrically connected. Also, the first electrical connection box 13 includes the relay busbar 90 that is provided inside the housing 30, and has the third connection surface 97 that is electrically connected to the first connection surface 84, and the fourth connection surface 99 that is electrically connected to the electrical component 51.

According to this configuration, within the housing 30, the electrical component 51 and the busbar 62 of the terminal block 60 can be electrically connected to each other via the relay busbar 90. By electrically connecting the second wire 22 to the second connection surface 86, the electrical component 51 can be electrically connected between the first wire 21 and the second wire 22. Therefore, it is no longer necessary to arrange an electrical connection box including the electrical component 51, and a terminal block, separately. Alternatively, it is no longer necessary to arrange an electrical connection box, and a terminal block including the electrical component 51, separately. Accordingly, a space for arranging other components can be increased by the dimension obtained by the omission of a possible terminal block to be separately arranged.

Also, the terminal block 60 includes the terminal support base 61 attached to the holder 40. Therefore, the part that directly supports the busbar 62 is separate from the holder 40. Accordingly, even if, for example, the busbar 62 has a complicated shape, it is possible to avoid a case where the holder 40 has a complicated shape. Also, since the terminal support base 61 supports the busbar 62, it is possible to prevent the busbar 62 from being unintentionally deformed, e.g., bent, when the third connection surface 97 is electrically connected to the first connection surface 84. In the present embodiment, when the first nut 112 is fastened to the first bolt 111 so that the third connection surface 97 is electrically connected to the first connection surface 84, the terminal support base 61 serves as a base for supporting the first bolt 111 and the busbar 62. Accordingly, in a state in which the orientation of the busbar 62 is stable by being supported by the terminal support base 61, it is possible to fasten the first nut 112 to the first bolt 111. Furthermore, it is possible to suppress unintentional deformation of the busbar 62 that may occur when the first nut 112 is fastened to the first bolt 111.

Also, since the terminal support base 61 that supports the busbar 62 is provided separately from the holder 40 that holds the electrical component 51, and from the housing 30, a wire harness that includes the first wire 21, the second wire 22, and the first electrical connection box 13 is easily manufactured. For example, if the terminal block 60 is attached to the holder 40, and then the electrical component 51 and the like are assembled to the holder 40, the assembling of the electrical component 51 and the like to the holder 40 may be complicated due to troublesome handling of the second wire 22. In the present embodiment, typically, a wire having a large diameter is used as the second wire 22, since the second wire 22 is electrically connected to the battery 12 that can supply a voltage of, for example, about a hundred and several tens of volts to several hundred of volts. Therefore, the handling of the second wire 22 may be more troublesome. However, in the present embodiment, since the terminal support base 61 is separate from the holder 40, during a process for manufacturing the first electrical connection box 13, upon completion of assembling the electrical component 51 and the like to the holder 40, it is possible to fit, to the holder 40, the terminal block 60 from which the second wire 22 has been drawn. That is to say, it is possible to attach the terminal block 60 to the holder 40 immediately before bringing the holder 40 into the housing 30. This facilitates the manufacturing of the first electrical connection box 13, and moreover, the manufacturing of a wire harness including the first electrical connection box 13 and the second wire 22.

Also, for example, if the holder 40 and the terminal support base 61 are formed as one piece, the shape of the holder 40 that includes the terminal support base 61 will be more complicated than the holder 40 according to the present embodiment in which the separate terminal support base 61 is provided. Therefore, if a molding die is used to manufacture the holder 40 including the terminal support base 61, the position of the holder 40 at which the terminal support base 61 is to be provided may be restricted in view of the structure of the molding die. In the present embodiment, since the holder 40 and the terminal support base 61 are formed as separate members, the holder 40 and the terminal support base 61 are formed by using separate molding dies. Accordingly, the position of the holder 40 at which the terminal support base 61 is to be provided has a higher degree of freedom than when the holder 40 and the terminal support base 61 are formed as one piece.

(2) The second connection surface 86 is perpendicular to the second direction X12, which intersects with the first direction X11. With this configuration, the second connection surface 86 is perpendicular to the second direction X12, which intersects with the first direction X11 perpendicular to the first connection surface 84. Therefore, the busbar 62 can be downsized in a direction parallel to the first connection surface 84, that is, a direction perpendicular to the first direction X11, compared to a case where the first connection surface 84 and the second connection surface 86 are coplanar. Also, the busbar 62 can be downsized in a direction perpendicular to the first direction X11, compared to a case where the first connection surface 84 and the second connection surface 86 are parallel to each other and are lined up without overlapping each other when viewed in the first direction X11. Accordingly, it is possible to reduce the area of an installation space for the busbar 62 when viewed in the first direction X11. As a result, the terminal block 60 can be downsized in a direction perpendicular to the first direction X11, thus making it possible to suppress an increase in the size of the first electrical connection box 13 including the terminal block 60. Since an increase in the size of the first electrical connection box 13 due to the addition of the terminal block 60 is suppressed in this way, even if the terminal block 60 is formed as one piece with the first electrical connection box 13, this can further contribute to increasing a space for arranging other components.

Also, since the size of the first electrical connection box 13 including the terminal block 60 is suppressed, the difficulties in ensuring a space for installing the first electrical connection box 13 in the vehicle 10 are likely to be eliminated. That is to say, even if the first electrical connection box 13, instead of an electrical connection box without any terminal block 60, is installed, the difficulties in ensuring the space for installing the first electrical connection box 13 are suppressed.

Note that in the present embodiment, the second direction X12 intersects perpendicularly with the first direction X11. Therefore, the second connection surface 86 is provided so as to be perpendicular to the first connection surface 84. Accordingly, it is possible to suppress a space for the second connection surface 86 to the minimum when the busbar 62 is viewed in the first direction X11. As a result, the busbar 62 can further be downsized in the direction parallel to the first connection surface 84, that is, the direction perpendicular to the first direction X11. Accordingly, it is possible to further reduce the area of an installation space for the busbar 62 when viewed in the first direction X11, resulting in a further downsizing of the terminal block 60 in the direction perpendicular to the first direction X11. As a result, it is possible to further suppress an increase in the size of the first electrical connection box 13 including the terminal block 60. This can contribute to increasing a space for arranging other components.

(3) The fourth connection surface 99 is perpendicular to the fourth direction X14, which intersects with the third direction X13. Therefore, the relay busbar 90 can be downsized in a direction parallel to the third connection surface 97, that is, a direction perpendicular to the third direction X13, compared to a case where the third connection surface 97 and the fourth connection surface 99 are coplanar. Also, the relay busbar 90 can be downsized in a direction perpendicular to the third direction X13, compared to a case where the third connection surface 97 and the fourth connection surface 99 are parallel to each other and are lined up without overlapping each other when viewed in the third direction X13. Accordingly, it is possible to reduce the area of an installation space for the relay busbar 90 when viewed in the third direction X13. As a result, it is possible to further suppress an increase in the size of the first electrical connection box 13. Accordingly, this can further contribute to increasing a space for arranging other components.

Also, in the present embodiment, the fourth direction X14 intersects perpendicularly with the third direction X13. Therefore, the fourth connection surface 99 is provided so as to be perpendicular to the third connection surface 97. Accordingly, it is possible to suppress a space for the fourth connection surface 99 to the minimum when the relay busbar 90 is viewed in the third direction X13. As a result, the relay busbar 90 can further be downsized in the direction parallel to the third connection surface 97, that is, the direction perpendicular to the third direction X13. Accordingly, it is possible to further reduce the area of an installation space for relay busbar 90 when viewed in the third direction X13. Also, in the first electrical connection box 13, the relay busbar 90 is arranged with the third connection surface 97 abutting against the first connection surface 84. Accordingly, the third direction X13 is parallel to the first direction X11. Therefore, it is possible to further reduce the area of an installation space for the relay busbar 90 when viewed in the first direction X11. Accordingly, it is possible to further suppress an increase in the size of the first electrical connection box 13 in the direction perpendicular to the first direction X11. As a result, it is possible to further contribute to increasing a space for arranging other components.

(4) The terminal block 60 includes the first bolt 111 that penetrates the first connection surface 84. Therefore, by using the first nut 112 that is screwed to the first bolt 111, the first wire 21 can easily be electrically connected to the first connection surface 84. That is to say, by fastening the first nut 112 to the first bolt 111, it is possible to easily electrically connect first terminal 101 connected to an end of the first wire 21 on one side to the first connection surface 84, without performing welding or the like.

(5) The terminal block 60 includes the second bolt 141 that penetrates the second connection surface 86. Therefore, by using the second nut 142 that is screwed to the second bolt 141, the second wire 22 can easily be electrically connected to the second connection surface 86. That is to say, by fastening the second nut 142 to the second bolt 141, it is possible to easily electrically connect the second terminal 131 connected to an end of the second wire 22 on one side to the second connection surface 86, without performing welding or the like.

(6) Typically, in vehicle 10, it is often the case that a fuse box is disposed near the battery 12. Note that the fuse box is a terminal block that has a fuse function, and corresponds to an example of a terminal block including an electrical component. Also, in this case, electric power of the battery 12 is distributed over electrical apparatuses and electrical connection boxes via the fuse box. In the present embodiment, the first electrical connection box 13 includes the fusible link 52, and thus it is possible to omit a fuse box that would have conventionally been disposed near the battery 12. As a result of the omission of a fuse box, other components can be disposed at a position at which this fuse box would have been disposed. Also, the number of components in the vehicle 10 can be reduced.

Other Embodiments

The present embodiment can be executed in the following modifications. The present embodiment and the following modifications can be executed in combinations in a range in which they do not technically contradict each other.

In the present embodiment, the terminal block 60 includes the second bolt 141. However, the terminal block 60 does not necessarily include the second bolt 141. In this case, the second terminal 131 is electrically connected to the second connection surface 86 by welding, pressure bonding, or the like, instead of fastening of the second bolt 141 and the second nut 142. Also, in the same case, the core wire of the second wire 22 may be electrically connected directly to the second connection surface 86 by welding or pressure-bonding, for example.

In the present embodiment, the terminal block 60 includes the first bolt 111. However, the terminal block 60 does not necessarily include the first bolt 111. In this case, the first connection surface 84 and the third connection surface 97 are electrically connected to each other by, for example, connecting the first connection 81 and the third connection 91 using welding, pressure bonding, or the like.

In the present embodiment, the fourth direction X14 is perpendicular to the third direction X13. However, in the present embodiment, the fourth direction X14 may be any direction that intersects with the third direction X13, other than a direction that intersects perpendicularly with the third direction X13. Even in such a case, the same effects as in the item (3) of the above-described embodiment can be realized. Also, the fourth direction X14 may be a direction parallel to the third direction X13.

In the above-described embodiment, the second direction X12 is perpendicular to the first direction X11. However, the second direction X12 does not need to be a direction that intersects perpendicularly with the first direction X11. For example, the second direction X12 may be any direction that intersects with the first direction X11, other than a direction that intersects perpendicularly with the first direction X11. With this, the same effects as in the item (2) of the above-described embodiment can be realized. Also, the second direction X12 may be a direction that is parallel to the first direction X11. In this case, the second connection surface 86 is parallel to the first connection surface 84, or is coplanar with the first connection surface 84. If the first connection surface 84 and the second connection surface 86 are coplanar, the busbar 62 may have the shape of a flat plate without any step.

The shape of the busbar 62 is not limited to the shape in the above-described embodiment as long as the busbar 62 includes the first connection surface 84 and the second connection surface 86. For example, the busbar 62 may have a shape that includes a step-shaped portion between the second connection 82 and the bent portion 83. Also, the busbar 62 may have a connection surface to which a wire other than the first wire 21 and the second wire is to be electrically connected.

The shape of the relay busbar 90 is not limited to the shape in the above-described embodiment as long as the relay busbar 90 includes the third connection surface 97 and the fourth connection surface 99. For example, the relay busbar 90 may have a shape that includes a step-shaped portion in the second coupling portion 94.

In the above-described embodiment, the fusible link 52 is taken as an example of the electrical component 51 to which the fourth connection surface 99 is electrically connected. However, the electrical component 51 to which the fourth connection surface 99 is electrically connected may be an electrical component other than a fusible link.

The shape of the terminal support base 61 is not limited to the shape in the above-described embodiment. It is sufficient that the terminal support base 61 has a shape such that it can support the busbar 62 and can be attached to the holder 40. For example, the support portion 71 may have the shape of a circular disk, and the fitting portion 72 may have the shape of a circular cylinder.

In the above-described embodiment, the terminal support base 61 is attached to the attaching portion 42, as a result of the first locked portion 77 being locked to the first locking portion provided on the attaching portion 42, and the second locked portion 78 being locked to the second locking portion provided on the attaching portion 42. However, the method for attaching the terminal support base 61 to the holder 40 is not limited to this. For example, the terminal support base 61 may have a configuration in which it is arranged on the holder 40, and is prevented from being removed from the holder 40 by the housing 30.

In the above-described embodiment, the attaching portion 42 is tubular. However, the shape of the attaching portion 42 is not limited to the shape in the above-described embodiment as along as the terminal support base 61 can be attached to the attaching portion 42. For example, the attaching portion 42 may be flat plate-shaped, and may include a part that can fix the terminal support base 61, such as a claw.

In the above-described embodiment, the first electrical connection box 13 includes only one terminal block 60. However, the first electrical connection box 13 may include a plurality of terminal blocks 60. In this case, the first electrical connection box 13 includes, for example, the same number of relay busbars 90 as the number of terminal blocks 60. Also, the busbar 62 of each terminal block 60 is electrically connected to a desired electrical component 51 held by the holder 40 via the relay busbar 90.

An end portion of the first wire 21 opposite to the end portion electrically connected to the fusible link 52 may also be electrically connected to an electrical apparatus 11 or an electrical connection box installed in the vehicle 10, other than the battery 12. Also, an end portion of the second wire 22 opposite to the end portion connected to the second electrical connection box 14 may be electrically connected to an electrical apparatus 11 or an electrical connection box installed in the vehicle 10, other than the second electrical connection box 14.

The following will describe technical ideas comprehensible from the above-described embodiment and the modifications.

(A) In the electrical connection box, the second direction intersects perpendicularly with the first direction.

According to this configuration, the second connection surface is provided so as to be perpendicular to the first connection surface. Accordingly, it is possible to suppress a space for the second connection surface to the minimum when the busbar is viewed in the first direction. As a result, the busbar can further be downsized in the direction parallel to the first connection surface, that is, the direction perpendicular to the first direction. Accordingly, it is possible to further reduce the area of an installation space for the busbar when viewed in the first direction, resulting in a further downsizing of the terminal block in the direction perpendicular to the first direction. As a result, it is possible to further suppress an increase in the size of the electrical connection box including the terminal block. Thus, this can contribute to increasing a space for arranging other components.

As shown in FIG. 4, the third direction X13 may be parallel to the first direction X11, and the fourth direction X14 may intersect with the second direction X12 and the third direction X13. Specifically, the fourth direction X14 may intersect perpendicularly with the second direction X12 and the third direction X13. In other words, the fourth connection surface 99 may also be provided so as to be perpendicular to the first connection surface 84, the second connection surface 86, and the third connection surface 97. Also, the fourth connection 92 may be provided so as to be perpendicular to the first connection 81, the second connection 82, and the third connection 91.

As shown in FIGS. 4 and 7, the first bolt 111 may include the head 111a, a boss that protrudes from the head 111a, and the shaft 111b that protrudes from the boss. The boss may have a size such that the outer diameter thereof is greater than the inner diameter of the first through hole 85 formed in the first connection 81 of the busbar 62, and is greater than the inner diameter of the third through hole 98 in the third connection 91 of the relay busbar 90. Also, the outer diameter of the boss may have a size such that it does not protrude from the head 111a. The leading end surface of the boss may protrude slightly from the support surface 73 in a state in which the first bolt 111 is assembled to the terminal support base 61. As shown in FIG. 7, the first connection 81 may abut against the boss in a state in which the first nut 112 is fastened to the first bolt 111. With this, it is possible to interpose the first connection 81 and the third connection 91 between the first nut 112 and the boss that are both made of a metal, and reliably connect the third connection 91 to the first connection 81. A gap may also be formed between the first connection 81 and the support surface 73.

As shown in FIG. 5, the first connection 81 may have a shape such that it does not protrude from the support portion 71, when viewed from a direction perpendicular to the support surface 73. Also, the third connection 91 may have a shape such that it does not protrude from the support portion 71, when viewed in a direction perpendicular to the support surface 73. As shown in FIG. 7, the third connection 91 may abut against the first connection 81 from the opposite side to the support surface 73. With this, the first connection 81 can easily abut against the support surface 73, and thus it is possible to suppress excessive deformation of the first connection 81, making it possible to suppress excessive deformation of the third connection 91.

As shown in FIG. 4, the head 111a of the first bolt 111 may be square columnar. The insertion recess 75 may have a square columnar fitting space to which the head 111a is fitted. As shown in FIG. 7, the retaining portion 75c may abut against the leading end surface of the head 111a. The insertion recess 75 may be referred to simply as a recess.

The busbar 62 may be referred to a busbar for external connection, and the relay busbar 90 may be referred to a busbar for internal connection.

The present disclosure includes the following implementation examples. Reference numerals of some constituent components of the exemplary embodiment are given not for restrictive reasons but for help in understanding. Some of the items described in the following implementation examples may be omitted, or some of the items described in the following implementation examples may be selected or extracted and combined with each other.

[Appendix 1]

In some aspects of the present disclosure, the third direction (X13) may be parallel to the first direction (X11), and the fourth direction (X14) may intersect with the second direction (X12) and the third direction (X13).

[Appendix 3]

In some aspects of the present disclosure, the terminal support base (61) may include a plate-shaped support portion (71) having a support surface (73), and a tubular portion (72) extending from the outer peripheral edge of the support portion (71), the terminal block (60) may include a first bolt (111) assembled to the support portion (71), the first bolt (111) may include a head (111a) that is inserted into the recess portion (75), a boss that protrudes from the head (111a), and a shaft (111b) that protrudes from the boss, the boss may protrude from the support surface (73), the busbar (62) may include a plate-shaped first connection (81) having the first connection surface (84), the relay busbar (90) may include a plate-shaped third connection (91) having the third connection surface (97), the first connection (81) may include a first through hole (85) that has an inner diameter greater than the outer diameter of the shaft (111b) and smaller than the inner diameter of the boss, and into which the shaft (111b) is inserted, the third connection (91) may include a third through hole (98) that has an inner diameter greater than the outer diameter of the shaft (111b) and smaller than the inner diameter of the boss, and into which the shaft (111b) is inserted, the third connection (91) may abut against the first connection (81) from the side opposite to the support surface (73), and the first connection (81) may abut against the boss in a state in which the first nut (112) is fastened to the first bolt (111).

[Appendix 4]

In one aspect of the present disclosure, the first connection (81) may have a shape such that it does not protrude from the support portion (71), when viewed in a direction perpendicular to the support surface (73).

[Appendix 5]

In one aspect of the present disclosure, the third connection (91) may have a shape such that it does not protrude from the support portion (71), when viewed in a direction perpendicular to the support surface (73).

[Appendix 6]

In one aspect of the present disclosure, the terminal block (60) may be configured to be inserted into the attaching portion (42) of the holder (40) from the inner side of the holder (40) in the first direction (X11), for example, linearly, so that the first connection surface (84) of the busbar (62) is arranged outside the housing (30) and/or the holder (40) in the first direction (X11), and the second connection surface (86) of the busbar (62) is arranged inside the housing (40) and/or the holder (50) in the first direction (X11).

[Appendix 7]

In one aspect of the present disclosure, the busbar (62) may have a configuration in which before the terminal block (60) is inserted into the attaching portion (42) of the holder (40), the second wire (22) is brought into contact with the second connection surface (86) from the outside of the terminal block (60) in the second direction (X12), and is fastened by the second bolt (141) from the outside of the terminal block (60) in the second direction (X12), and before the terminal block (60) is inserted into the attaching portion (42) of the holder (40) or after the terminal block (60) has been inserted into the attaching portion (42) of the holder (40), the third connection surface (97) of the relay busbar (90) is brought into contact with the first connection surface (84) from the outside of the terminal block (60) in the first direction (X11), and is fastened by the first bolt (111) from the outside of the terminal block (60) in the first direction (X11).

[Appendix 8]

In one aspect of the present disclosure, the busbar (62) may be an L-shaped plate that is bent so that the first connection surface (84) substantially makes a right angle with the second connection surface (86), and the heads (111a, 141a) of the first bolt (111) and the second bolt (141) may be arranged on the inner side of the L shape of the busbar (62), and the shafts (111b, 141b) of the first bolt (111) and the second bolt (141) may be arranged on the outer side of the L shape of the busbar (62).

LIST OF REFERENCE NUMERALS

10 Vehicle
12 Battery
13 First electrical connection box (electrical connection box)
14 Second electrical connection box
15 Engine room
21 First wire 22 Second wire
30 Housing
31 Case
32 Cover
33 First wire draw-out opening
34 Exposure opening
35 Second wire draw-out opening
40 Holder
41 Holding recess
42 Attaching portion
51 Electrical component
52 Fusible link
53 Case
54 Power source distribution busbar
55 First terminal portion
56 Second terminal portion
56a Second terminal portion
57 Conductive portion
58 Fusing portion
60 Terminal block
61 Terminal support base
62 Busbar
71 Support portion
71a Side surface
72 Fitting portion
73 Support surface
74 Insertion hole
75 Insertion recess
75b Opening
75c Retaining portion
75d Insertion opening
76 Cutout
77 First locked portion
77a First locked surface
78 Second locked portion
81 First connection
82 Second connection
83 Bent portion
84 First connection surface
85 First through hole
86 Second connection surface
87 Second through hole
90 Relay busbar
91 Third connection
92 Fourth connection
93 First coupling portion
94 Second coupling portion
95 First bent portion
96 Second bent portion
97 Third connection surface
98 Third through hole
99 Fourth connection surface
100 Fourth through hole
101 First terminal
102 First wire-side connection
103 Bolt
104 Nut
111 First bolt
111a Head
111b Shaft
112 First nut
121 Bolt
122 Nut
131 Second terminal
132 Insulating member
133 Second wire-side connection
134 Second connection hole
141 Second bolt
141a Head
141b Shaft
142 Second nut
X1 Fitting direction
X11 First direction
X12 Second direction
X13 Third direction
X14 Fourth direction

What is claimed is:

1. An electrical connection box comprising:
a housing;
a holder that is provided inside the housing, and holds an electrical component to which a first wire is to be electrically connected; and
a terminal block attached to the holder,
wherein the terminal block includes a terminal support base attached to the holder, and a busbar supported on the terminal support base,
the busbar includes a planar first connection surface, and a planar second connection surface to which a second wire is to be electrically connected, the second wire being different from the first wire, and
the electrical connection box further comprises a relay busbar that is provided inside the housing, and includes a third connection surface that is electrically connected to the first connection surface, and a fourth connection surface that is electrically connected to the electrical component.

2. The electrical connection box according to claim 1, wherein when a direction perpendicular to the first connection surface is defined as a first direction, the second connection surface is perpendicular to a second direction that intersects with the first direction.

3. The electrical connection box according to claim 1, wherein when a direction perpendicular to the third connection surface is defined as a third direction, the fourth connection surface is perpendicular to a fourth direction that intersects with the third direction.

4. The electrical connection box according to claim 1, wherein the terminal block includes a first bolt that penetrates the first connection surface and the third connection surface.

5. The electrical connection box according to claim 1, wherein the terminal block includes a second bolt that penetrates the second connection surface.

* * * * *